Figure 1:
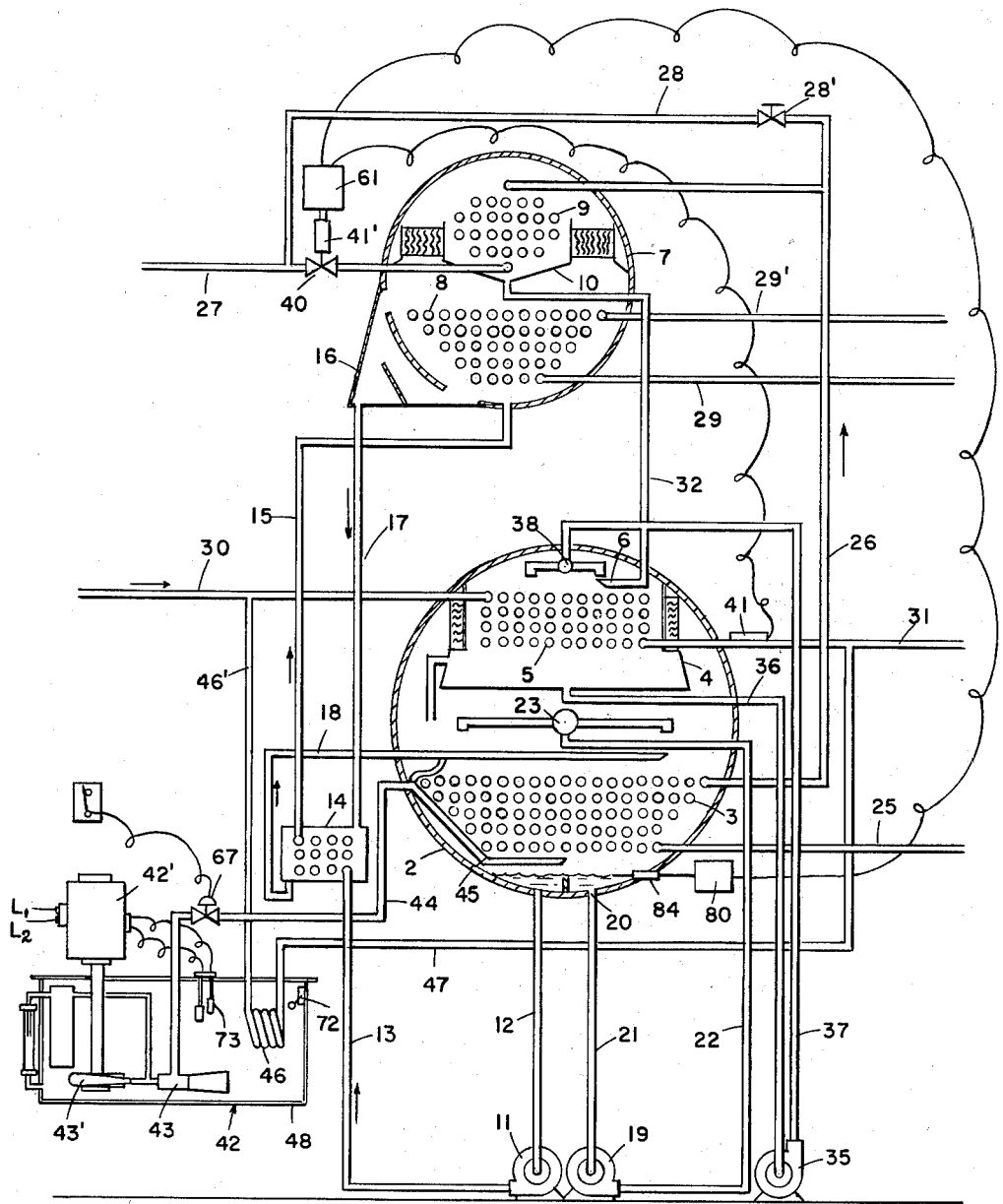

Aug. 9, 1960  J. E. EMBURY, SR  2,948,124
ABSORPTION REFRIGERATION SYSTEMS
Filed April 11, 1957  2 Sheets-Sheet 1

INVENTOR.
JOSEPH E. EMBURY, SR.
BY Herman Seid
ATTORNEY.

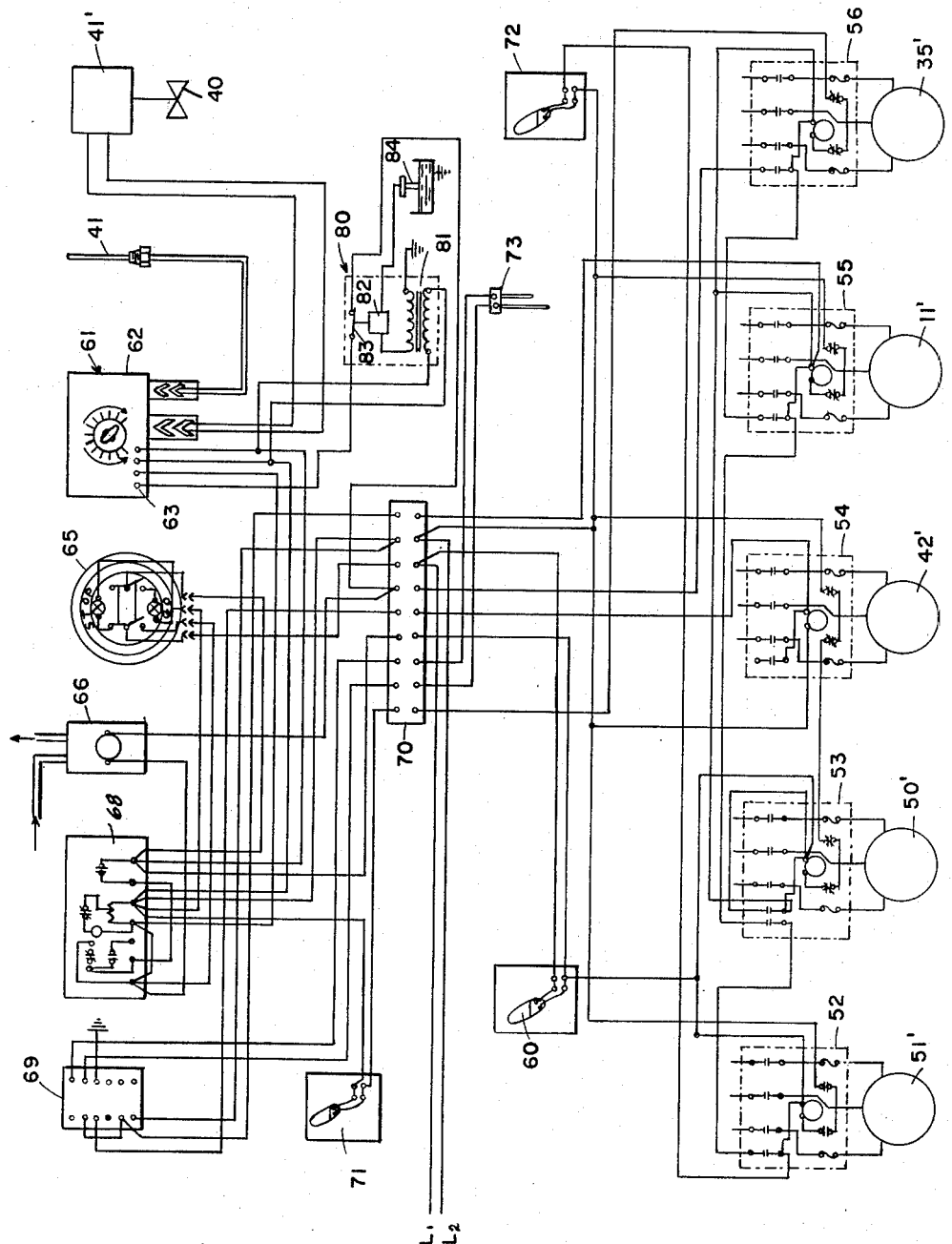

United States Patent Office 2,948,124
Patented Aug. 9, 1960

2,948,124

ABSORPTION REFRIGERATION SYSTEMS

Joseph E. Embury, Sr., Memphis, N.Y., assignor to Carrier Corporation, Syracuse, N.Y., a corporation of Delaware Filed Apr. 11, 1957, Ser. No. 652,205

10 Claims. (Cl. 62—104)

This invention relates to absorption refrigeration systems and, more particularly, to an absorption refrigeration system including control means for preventing overconcentration of solution in the generator; that is, a concentration greater than the desired solution concentration leaving the generator.

If solution in an absorption refrigeration system is overconcentrated, there is a tendency toward crystallization and hence solidification of the solution in the solution heat exchanger and in other elements of the system which is highly undesirable. Sometimes, at start-up, the volume of non-condensible gases present in the system is large so that it is desirable to operate the purge arrangement to remove such gases prior to the time refrigeration is provided; otherwise, overconcentration of solution might result.

The present invention is concerned with an inexpensive control mechanism which senses a tendency toward overconcentration of solution and effects immediately corrective measures to prevent overconcentration. Since substantially the first indication of overconcentration of solution is a decrease in the level of solution in the absorber of the system, preferably, a level sensing element is provided in the absorber to which the control mechanism responds to discontinue passage of condensing medium through the condenser of the system. Discontinuing flow of condensing medium through the condenser prevents condensation so that refrigerant is not boiled off in the generator and the absorber receives a more dilute solution (reduced concentration). This dilute solution in the absorber reduces the ability of the absorber to absorb refrigerant so that less refrigerant is evaporated in the evaporator with a resultant decrease in capacity (tonnage of refrigeration) of the system. Capacity of the system may be controlled or regulated by a valve in the condensing water line.

The chief object of the present invention is to provide an absorption refrigeration system including control mechanism effective to prevent overconcentration of solution leaving the generator.

An object of the present invention is to provide an absorption refrigeration system in which the control mechanism is responsive to a decrease in the level of solution in the absorber to prevent concentration of solution greater than a desired solution concentration leaving the generator.

A further object is to provide a method of operation of an absorption refrigeration system to prevent overconcentration of solution in the generator. Other objects of the invention will be readily perceived from the following description.

This invention relates to an absorption refrigeration system comprising, in combination, an absorber, an evaporator, vapor from the evaporator flowing to the absorber to be absorbed by solution therein, a condenser, a generator, vapor from the generator flowing to the condenser to be condensed therein, condensate from the condenser passing to the evaporator, means to supply weak solution from the absorber to the generator, means to supply strong solution from the generator to the absorber, means for controlling the capacity of the system, and means for actuating the controlling means to prevent concentration of solution greater than a desired solution concentration leaving the generator.

This invention further relates to a method of operation of an absorption refrigeration system in which the steps consist in supplying weak solution from the absorber to the generator, supplying strong solution from the generator to the absorber, heating solution in the generator to concentrate the solution, vapor so formed passing to the condenser, passing cooling medium through the condenser to condense vapor therein, condensate so formed passing to the evaporator, passing medium to be cooled through the evaporator in heat exchange relation with refrigerant therein, governing the capacity of the system by regulating the flow of condensing medium through the condenser and discontinuing the flow of condensing medium through the condenser to prevent overconcentration of solution leaving the generator.

The attached drawings illustrate a preferred embodiment of the invention, in which Figure 1 is a diagrammatic view illustrating the absorption refrigeration system of the present invention; and Figure 2 is a wiring diagram of the control mechanism for the absorption refrigeration system shown in Figure 1.

Referring to the attached drawings, there is illustrated diagrammatically in Figure 1 the absorption refrigeration system of the present invention. The system comprises a shell 2, containing a plurality of tubes 3, which cooperate with the shell to form an absorber. Placed in shell 2 above absorber 3 is a pan-like member which cooperates with shell 2 to form an evaporator 4. A plurality of tubes 5 extend longitudinally of the shell above the pan-like member. Medium to be cooled passes through these tubes in heat exchange relation with liquid refrigerant sprayed thereover. A vapor condensate return header 6 is placed over the tubes 5 and serves to discharge condensate thereover.

A second shell 7, preferably, is placed above the first shell. Tubes 8 extend in the lower portion of shell 7 and cooperate with shell 7 to form a generator. A plurality of tubes 9 are placed in the upper portion of shell 7 to form a condenser. The tubes 9 cooperate with a pan-like member 10 to form the condenser. Both shells are supported in desired position on supports (not shown).

Pump 11 withdraws weak solution from absorber 3 through line 12. Pump 11 forwards weak solution through line 13 to heat exchanger 14 in which the weak solution is placed in heat exchange relation with strong solution returning from the generator as hereinafter described. The weak solution is then forwarded from heat exchanger 14 through line 15 to generator 8. Strong solution flows from generator 8 through overflow arrangement 16, line 17, heat exchanger 14, and line 18 to the absorber, preferably, being discharged therein adjacent one end of shell 2. Strong solution flows through forces of gravity from the generator to the absorber. It will be understood, of course, if desired, the strong solution may be discharged in the absorber over the tubes therein.

Pump 19 serves as an absorber pump and is employed to withdraw a solution of intermediate concentration from absorber 3 through outlet 20 and line 21. Pump 19 forwards the solution of intermediate concentration through line 22 to the absorber. Spray arrangement 23 serves to distribute the recirculated solution over the tubes throughout the length of the absorber 3. It will be understood that the strong solution mixes to some extent with solution in the absorber and that further mixing occurs as the pump 19 forwards the mixed solution so that a solution having a concentration intermediate the concentration of the strong and weak solutions is circulated. Reference is made to co-pending application, Serial No. 505,369, filed April 8, 1955, in the name of Louis H. Leonard, Jr., now Patent No. 2,840,997, granted July 1, 1958, for a more detailed description of the flow of solution in the system.

Condensing water is forwarded by a pump (not shown) through line 25 to the tubes 3 of the absorber. The condensing water passes from the tubes 3 of the absorber through line 26 to the tubes 9 of the condenser. Condensing water leaves the tubes 9 of the condenser through line 27. A bypass line 28 having a throttling valve 28' is provided about the tubes of the condenser extending from line 26 to line 27.

Steam is supplied to the tubes 8 of the generator through line 29'. If desired, a suitable pressure regulating valve (not shown) may be placed in line 29' to assure a desired steam pressure in the generator. Steam condensate leaves the tubes of generator 8 through line 29, a suitable steam trap (not shown) being provided in line 29 to assure that only condensate leaves the generator.

Medium to be cooled is forwarded by a pump (not shown) through line 30 to the tubes or coil 5 of evaporator 4. The cooled medium leaves the tubes 5 through line 31 and is forwarded to a place of use such as the central station of an air conditioning system. The medium, after passing through the central station, returns to the evaporator 4 through line 30 to be again cooled and reused.

Condensate leaves condenser 9 through line 32 and is returned to header 6 in the evaporator and discharged in the evaporator over the tubes 5 to wet the tubes. It will be appreciated the refrigerant is flashed or vaporized to cool the same upon its discharge in the evaporator and is vaporized by its heat exchange relation with medium passing through the tubes of the evaporator. The flashed vapor passes to absorber 3 to be absorbed by the solution therein.

Pump 35 serves to recirculate liquid refrigerant collected in the evaporator. Pump 35 is connected to the evaporator by line 36 to withdraw liquid refrigerant therefrom. Pump 35 forwards the liquid refrigerant through line 37 to spray arrangement 38 of the evaporator, the liquid refrigerant flash cooling upon discharge in the evaporator, remaining liquid refrigerant wetting the tubes to cool medium passing through the tubes. The heat exchange relation between medium passing through the tubes and the liquid refrigerant on the exterior of the tubes cools the medium and evaporates the liquid refrigerant. The vapor passes to the absorber as previously described.

A valve 40 placed in line 27 between the tubes 9 of the condenser and the juncture of bypass line 28 with line 27 serves to control the capacity of the system by regulating passage of condensing water through the tubes of the condenser. Valve 40 is regulated through control 61 in response to the temperature sensed by a temperature sensing element 41 placed in contact with line 31. Element 41 reflects the temperature of chilled medium leaving the evaporator so that valve 40 is actuated responsive to the temperature of chilled medium leaving the evaporator which, in effect, indicates the load imposed upon the system.

A suitable purge arrangement indicated generally at 42 is provided to remove non-condensible gases from the absorber. The ejector 43 of purge arrangement 42 is connected by line 44 to a purge line 45 extending longitudinally of the absorber. The cooling coil 46 of purge arrangement 42 is connected to line 30 by line 46' and to line 31 by line 47, permitting medium to be employed for cooling solution in the purge tank 48. The purge arrangement 42 is disclosed and claimed in co-pending application, Serial No. 565,324, filed February 14, 1956, in the name of Louis H. Leonard, Jr., now Patent No. 2,940,273, granted June 14, 1960, and reference is made to such application for a more complete description of the purging arrangement.

A more detailed description of the absorber and the evaporator are disclosed and claimed in co-pending application, Serial No. 580,052, filed February 3, 1956, in the name of Louis H. Leonard, Jr., now Patent No. 2,918,807, granted December 29, 1959.

The basic control arrangement for the absorption refrigeration system is disclosed and claimed in Leonard Patent No. 2,722,805, granted November 8, 1955, entitled "Control Arrangement for Absorption Refrigerant System," except that such arrangement is essentially pneumatically operated while the present control arrangement is electrically operated.

The control arrangement is designed to actuate capacity control valve 40 to move toward open or closed positions responsive to the load imposed on the system as reflected by the temperature of cooled medium leaving the evaporator. The electrical circuit of the control arrangement includes starters 52, 53, 54, 55, 56 for the motors 51', 50', 42', 11', 35' which serve to actuate the condenser water pump (not shown), the chilled water pump (not shown), the purge pump 43', the evaporator solution pump 11 and the evaporator pump 35, respectively. The pressure switch and electronic capacitor controller 61 are also included in the circuit. Controller 61 includes a temperature responsive potentiometer 62, only the terminal block 63 of the electronic amplifier circuit of controller 61 being shown in Figure 2. Potentiometer 62 responds to the electrical resistance type sensing element 41 to operate valve motor 41'. Push button 65 having "stop-and-go" positions is included in the circuit to permit simple, ready operation of the system.

The circuit also includes an electric pneumatic relay 66 which supplies compressed air to the penumatic operated purge valve 67. A control relay 68 controls push button 65, upon operation of a safety control, as hereinafter explained.

Liquid level control 69 is employed in the purge arrangement, as explained in the co-pending application referred to above. The main panel terminal block of the circuit is shown at 70. Safety control 71 is provided to prevent freezing of the evaporator in the event of improper operation. Safety control 72 is employed in the purge arrangement and comprises a high level float switch which serves to prevent overflow from the purge tank. The control probes 73 are employed in the purge arrangement as described in the co-pending application referred to above.

The elements described above comprise the basic control arrangement of the absorption refrigeration system shown in Figure 1. The present invention is concerned with a modification or improvement in the basic control system to prevent overconcentration of solution or concentration of solution greater than a desired concentration of solution leaving the generator. For this purpose control 80 is provided.

Control 60 includes the transformer 81 and holding coil 82 to actuate switch 83, the holding coil 82 being connected to a level sensing element 84 placed in the absorber to sense or reflect the level of solution in the absorber. The first indication of overconcentration of solution is a decrease in the level of solution in the absorber. The capacity control valve 40 may be closed to prevent overconcentration.

When the solution level in the absorber is high enough to cover element 84, a low voltage current across the element is maintained. Control valve 40 remains open. If the level drops, however, indicating a tendency toward overconcentration of solution in the generator, the circuit is broken, control 80 acting on capacity controller 61 to close valve 40. Closing the valve prevents condensing medium passing through the tubes 9 of the condenser discontinuing concentration and beginning dilution of the solution. When the solution level in the absorber rises again, the valve opens, the solution again concentrates and the system produces refrigeration.

The elements included in the control arrangement are standard and may be purchased in the open market. For example, the elements may be obtained as follows:

| | Supplier | Part Number |
|---|---|---|
| Control point adjuster (potentiometer). | M.H.[1] | MD55126A1K1. |
| Liquid level control | Photoswitch, Inc. | 10CB4 Model 1001. |
| Control Relay | General Electric | CR2820-1740-2. |
| E. P. relay | M.H.[1] | R0400A. |
| Insertion thermostat or temperature sensing element. | M.H.[1] | 921A2. |
| Low temperature safety control. | M.H.[1] | T414A. |
| Pressure switch | M.H.[1] | L404B. |
| High level safety control | Mercoid Corp. | Type 41. Spec. 6108. |
| Probe Assembly | Photoswitch, Inc. | 67DJ2 Model 1000. |
| Relay (concentration control) | Charles F. Warrick Co. | Type D2. |
| Concentration probe assembly. | Charles F. Warrick Co. | Type B1B. |

[1] Minneapolis Honeywell Regulator Co.

The preferred absorbing solution is a solution of lithium bromide and water. The preferred refrigerant is water. Preferably, the solution concentration leaving the generator is about 66%. As stated above, a greater concentration may permit crystallization to occur, causing solidification in the heat exchanger and perhaps in other portions of the system.

The term "weak solution" is used herein to describe a solution weak in absorbing power. The term "strong solution" is used herein to define a solution strong in absorbing power.

Considering operation of the absorption refrigeration system, when the push button 65 is moved to its "go" position, current is supplied to valve motor 41' to open valve 40 and to energize motors 51', 40', 42', 11' and 35' thus actuating the condensing water pump, the chilled water pump, the purge pump, the solution pump and the evaporator pump. The amplifier circuit of control 61 is energized as well as the electric pneumatic relay 66. Pressure switch 60 closes and purge valve 67 opens. The control relay timed out contact opens. Control 80 is also energized.

The condensing water pump supplies condensing water through the tubes of absorber 3 and the tubes of condenser 9 in heat exchange relation with solution in the absorber and with vapor in the condenser. The chilled water pump circulates cooled medium from the evaporator 5 through line 31 to a place of use and returns the medium therefrom through line 30 to the tubes of the evaporator.

Purge pump 43' circulates solution in the tank of purge arrangement 42 thereby actuating the ejector 43 to induce non-condensible gases from absorber 3. Solution pump 11 withdraws weak solution from the absorber and forwards the weak solution through heat exchanger 14 to generator 8 strong solution returning from the generator through line 17, heat exchanger 14 and line 18 to the absorber. The evaporator pump 35 withdraws refrigerant from evaporator 4 and recirculates the withdrawn refrigerant to the evaporator where it is discharged over the tubes 5 therein, thus cooling medium passing through the tubes. The machine is thus placed in operation to provide refrigeration at full capacity. During operation, of course, the capacity of the system is varied, depending upon the temperature of cooling medium leaving the evaporator as reflected by element 41 functioning through capacity controller 61 to move valve 40 toward open or closed positions.

Assuming, however, that for one reason or another there is a tendency toward overconcentration of the lithium bromide solution in the generator. The first indication or such overconcentration is a decrease in the level in the absorber of the system. To correct overconcentration, capacity control valve 40 should be closed.

Under normal operating conditions the solution level in the absorber is at a point sufficient to cover sensing element 84 so that a low voltage electrical circuit across the element is maintained and through control 80 valve 40 remains open. If the level decreases, element 84 is uncovered. The circuit is broken and through control 80 and control 61, valve 40 is moved to a closed position. When valve 40 is closed, condensing water cannot pass through the tubes 9 of the condenser so that concentration of solution in the generator is stopped and dilution begins. When the solution in the absorber increases to a point where it covers element 84, the electrical circuit is again completed and valve 40 is opened permitting the solution in the generator to be concentrated again and permitting the system to produce refrigeration.

The present device permits automatic operation of an absorption refrigeration system regardless of whether the machine is completely purged. If the machine is not purged sufficiently to operate without solidification, the solution will concentrate until the purge lines are uncovered and then purge without concentrating until ready to produce refrigeration.

The present invention provides a simple control means to prevent overconcentration of solution in the generator employing solution level in the absorber as a means to indicate the tendency toward overconcentration. The present invention permits the system to balance automatically during changes in entering condensing water temperature which otherwise might cause overconcentration.

While I have described a preferred embodiment of the invention it will be understood that the invention is not limited thereto, since it may be otherwise embodied within the scope of the following claims:

I claim:

1. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, means to supply weak solution from the absorber to the generator, means to supply strong solution from the generator to the absorber, means for regulating the capacity of the system including a valve to regulate passage of condensing medium through the condenser in heat exchange relation with vapor therein and a temperature responsive control for actuating said valve and means responsive to the level of solution in the absorber for governing operation of the regulating means to prevent concentration of solution greater than a desired solution concentration leaving the generator.

2. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, means to supply weak solution from the absorber to the generator, means to supply strong solution from the generator to the absorber, a heat exchange member in said evaporator, means for passing medium to be cooled through the heat exchange member in heat exchange relation with refrigerant in the evaporator, means for regulating the capacity of the system including a valve to regulate passage of condensing medium through the condenser in heat exchange relation with vapor therein and a control responsive to the temperature of cooled medium leaving the evaporator to actuate said valve and means responsive to the level of solution in the absorber for governing operation of the regulating means to prevent concentration of solution greater than a desired solution concentration leaving the generator.

3. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, means to supply weak solution from the absorber to the generator, means to supply strong solution from the generator to the absorber, a valve for regulating flow of condensing water through the condenser, a motor to actuate said valve, a temperature responsive control for actuating said valve motor, an electrical circuit including the valve motor and said control to energize the valve motor, said control being responsive to the temperature of medium cooled in the evaporator to regulate movement of the valve toward open and closed positions and means in said circuit responsive to a condition of the solution in the absorber for deenergizing the valve motor to close the valve thus discontinuing passage of condensing medium through the condenser to prevent overconcentration of solution in the generator.

4. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, means to supply weak solution from the absorber to the generator, means to supply strong solution from the generator to the absorber, a heat exchange member in said evaporator, means for passing a medium to be cooled through said heat exchange member in heat exchange relation with refrigerant in the evaporator, means for regulating the capacity of the system including a valve to regulate passage of condensing medium through the condenser in heat exchange relation with vapor therein, a motor to actuate said valve and a control responsive to the temperature of cooled medium leaving the evaporator to actuate the valve motor, an electrical circuit including the valve motor and said control, and means in said circuit responsive to a decrease in the level of solution in the absorber for governing operation of the regulating means to prevent passage of condensing medium through the valve, thereby preventing overconcentration of solution in the generator.

5. An absorption refrigeration system according to claim 4 in which the circuit includes a sensing element placed in the absorber to indicate a decrease in the level of solution therein.

6. In a method of operation of an absorption refrigeration system, the steps which consist in supplying weak solution from the absorber to the generator, supplying strong solution from the generator to the absorber, heating solution in the generator to concentrate the solution, vapor so formed passing to the condenser, passing cooling medium through the condenser to condense vapor therein, condensate so formed returning to the evaporator, passing medium to be cooled through the evaporator in heat exchange relation with refrigerant therein, governing the capacity of the system by regulating the flow of cooling medium through the condenser in heat exchange relation with vapor therein to condense the same, and discontinuing the flow of cooling medium through the condenser responsive to a predetermined decrease in the level of solution in the absorber to prevent overconcentration of solution in the generator.

7. In a method of operation of an absorption refrigeration system, the steps which consist in supplying weak solution from the absorber to the generator, supplying strong solution from the generator to the absorber, heating solution in the generator to concentrate the solution, vapor so formed passing to the condenser, passing cooling medium through the condenser to condense vapor therein, condensate so formed returning to the evaporator, passing medium to be cooled through the evaporator in heat exchange relation with refrigerant therein, governing the capacity of the system, and overriding the governing means in response to a predetermined decrease in the level of solution in the absorber to prevent overconcentration of solution in the generator.

8. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, means to supply weak solution from the absorber to the generator, means to supply strong solution from the generator to the absorber, means for regulating the capacity of the system including a valve to regulate passage of condensing medium through the condenser in heat exchange relation with vapor therein and a temperature responsive control for actuating said valve, and means for governing operation of the regulating means to prevent concentration of solution greater than a desired solution concentration leaving the generator, said governing means including a sensing element placed in the absorber for sensing the level of solution in the absorber.

9. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, means to supply weak solution from the absorber to the generator, means to supply strong solution from the generator to the absorber, said evaporator including a heat exchange member, means for passing medium to be cooled through the heat exchange member in heat exchange relation with refrigerant in the evaporator, means for regulating the capacity of the system including a valve to regulate passage of condensing medium through the condenser in heat exchange relation with vapor therein and a control for actuating said valve in response to the temperature of cooled medium leaving the evaporator, and means for governing operation of the regulating means to prevent concentration of solution greater than a desired solution concentration leaving the generator, said governing means including a sensing element placed in the absorber for sensing the level of solution in the absorber.

10. In an absorption refrigeration system, the combination of an absorber, an evaporator, vapor from the evaporator flowing to the absorber to be absorbed by solution therein, a condenser, a generator, vapor from the generator flowing to the condenser to be condensed therein, condensate from the condenser passing to the evaporator, means to supply weak solution from the absorber to the generator, means to supply strong solution from the generator to the absorber, a valve for regulating flow of condensing water through the condenser, a motor to actuate said valve, a temperature responsive control for actuating said valve motor, an electrical circuit including the valve motor and said control to energize the valve motor, said control being responsive to the temperature of medium cooled in the evaporator to regulate movement of the valve toward open and closed positions and means in said circuit for deenergizing the valve motor to close the valve thus discontinuing passage of condensing medium through the condenser to prevent overconcentration of solution in the generator, said deenergizing means including a sensing element placed in the absorber responsive to a decrease in the level of solution therein.

References Cited in the file of this patent

UNITED STATES PATENTS

| | | |
|---|---|---|
| 2,056,818 | Beline | Oct. 6, 1936 |
| 2,061,606 | Zellhoefer | Nov. 24, 1936 |
| 2,461,513 | Berestneff | Feb. 15, 1949 |
| 2,480,497 | Meyer | Aug. 30, 1949 |
| 2,494,972 | Thomas | Jan. 17, 1950 |
| 2,722,805 | Leonard | Nov. 8, 1955 |
| 2,722,806 | Leonard | Nov. 8, 1955 |
| 2,795,115 | Kumm | June 11, 1957 |